(12) United States Patent  
Bryant, Sr. et al.

(10) Patent No.: US 8,678,329 B1  
(45) Date of Patent: Mar. 25, 2014

(54) TRANSPORTING DEVICE

(76) Inventors: Thomas G. Bryant, Sr., Plainfield, IL (US); Angel M. Feliciano, Jr., Homer Glen, IL (US)

(*) Notice: Subject to any disclaimer, the term of this patent is extended or adjusted under 35 U.S.C. 154(b) by 975 days.

(21) Appl. No.: 12/244,061

(22) Filed: Oct. 2, 2008

Related U.S. Application Data

(63) Continuation-in-part of application No. 11/416,694, filed on May 3, 2006, now Pat. No. 7,484,594.

(51) Int. Cl.
*A47K 1/04* (2006.01)
*A47F 5/02* (2006.01)
*F16M 11/00* (2006.01)
*E04G 1/00* (2006.01)
*B62B 3/00* (2006.01)

(52) U.S. Cl.
USPC ........... 248/129; 248/130; 248/133; 248/136; 248/176.1; 182/20; 182/127; 182/169; 182/116; 280/47.31; 280/47.41; 280/645; 280/79.11; 280/47.35; 280/47.19; 280/79.6; 280/79.4; 280/47.24; 280/47.29

(58) Field of Classification Search
USPC .............. 248/129, 130, 133, 136, 139, 176.1, 248/172, 107, 675; 182/20, 127, 169, 116; 280/47.28, 47.31, 47.33, 47.41, 30, 280/47.3, 47.32, 63, 78, 645, 79.7, 47.15, 280/13, 79.1, 79.3, 79.11, 47.34, 47.35, 280/47.19, 79.6, 79.4, 47.24, 47.26, 47.29, 280/651; 16/29–30; 242/557, 594.4; 211/206, 182, 189

See application file for complete search history.

(56) References Cited

U.S. PATENT DOCUMENTS

| | | | | |
|---|---|---|---|---|
| 2,046,516 A * | 7/1936 | Johnson | ........................ | 182/16 |
| 3,731,947 A * | 5/1973 | Fontaine | ...................... | 280/641 |
| 3,991,852 A * | 11/1976 | Brookes et al. | ............... | 182/169 |
| 4,049,283 A * | 9/1977 | Brookes et al. | .......... | 280/47.131 |
| 4,266,748 A * | 5/1981 | Dalton | ......................... | 248/425 |
| 4,987,972 A * | 1/1991 | Helms | ......................... | 182/187 |
| 5,042,614 A * | 8/1991 | Rainey | .......................... | 182/22 |
| 5,882,023 A * | 3/1999 | Swager | .................... | 280/47.131 |
| 6,139,164 A * | 10/2000 | Bolta et al. | ................. | 362/217.1 |
| 6,182,920 B1 * | 2/2001 | Watkins | .................... | 242/594.4 |
| 6,217,045 B1 * | 4/2001 | Leyton | ......................... | 280/79.7 |
| 6,322,061 B1 * | 11/2001 | Maser et al. | .................... | 269/17 |
| 2004/0108671 A1 * | 6/2004 | Forsberg et al. | ............. | 280/79.3 |
| 2006/0061146 A1 * | 3/2006 | Grace | ......................... | 297/16.2 |

* cited by examiner

*Primary Examiner* — Terrell McKinnon
*Assistant Examiner* — Christopher Garft (57) ABSTRACT

A device for transporting a ladder has first and second frame positions, the lower ends of which are pivotally mounted on an axle that also mounts a wheel for rolling along the ground. The upper ends of the frame portions are moveable toward and away from each other allowing the device to collapse for storage. A hook is mounted on the upper end of each of the frame portions for attachment to adjacent rungs of the ladder. A strap connects the upper ends of the frame portion to prevent them from separating from each other beyond a given distance.

17 Claims, 6 Drawing Sheets

TRANSPORTING DEVICE

The present application is a Continuation-in-Part of our co-pending application filed May 3, 2006 and assigned Ser. No. 11/416,694. The present application is a device for transporting long objects having at least one wheel and a structure for supporting an elongate object, such as a ladder.

BACKGROUND OF THE INVENTION

Those involved in the service and construction industries are frequently required to deliver ladders and other long objects, such as long boards, pipe and the like to a work site. Service personnel often work alone and as a result, the task of moving long heavy ladders, pipe, and other awkward elongate material must be undertaken by one person. Even when there are several people on the same work site, the task of transporting elongate material may fall to a single individual. Frequently, the elongate material must be removed from a roof or side rack of a vehicle, which is a difficult task in itself.

Not only is the task of moving long heavy objects difficult, injuries occur when one strains to obtain and maintain control of a long heavy object. It would be desirable therefore to provide a device which will simplify the transporting of long heavy objects.

The fire fighting industry has a great need for a transportation aid. A fire crew called to a large fire is often blocked from parking near the area by earlier arriving vehicles. The fire fighters are then required to transport heavy equipment, including ladders, to the scene while wearing heavy protective clothing.

Also, every piece of equipment to be transported to a fire must be carried on the fire truck. Preferably, the truck carries every piece of equipment that the fire fighters may need, and unfortunately, many pieces that may not be needed for any particular emergency. For all practical purposes, there is no space on a fire truck for another piece of equipment. It would therefore be further desirable to provide a transporting device which would collapse to occupy as little space as possible so as to be readily transportable along with the ladder or other elongate material on an emergency vehicle or fire truck.

SUMMARY OF THE INVENTION

Briefly, the present invention is embodied in a transporting device for transporting a ladder or the like over ground. The device includes first and second frame members with each of the first and second frame members having an upper end and a lower end. An axle extends through the lower ends of the first and second frame members such that the frame members are independently pivotable about the axle. A wheel is also mounted on the axle such that the frame member is moveable across the underlying ground.

At the upper end of the first frame member is a first hook for removably receiving a first rung of a ladder and at the upper end of the second frame member is a second hook for removably receiving a second rung of the ladder. A connector extends between the first and second frame members, with the connector being longitudinally collapsible such that the upper ends of the first and second frame members are moveable towards and away from each other with the maximum separation between the upper ends of the two frame members being limited by the length of the connector.

In one embodiment, the first hook has a generally U-shaped configuration, with the outer ends of the U defining a fixed open end. The parallel side members that define the upper ends of the U define a channel for receiving the rung of a ladder. In similar manner, the second hook also has a U-shaped configuration with parallel side members defining a fixed open end between which another rung of the ladder is received.

In another embodiment of the invention, a removable pin is extended through the distal ends of the parallel arms of the second hook for retaining the second rung in the second hook.

In yet another embodiment of the invention, at least one of the first and second frames is longitudinally compressible with a latch for latching the frame member in the extended position. The frame member can be latched into the extended position for transporting a piece of equipment such as a ladder or the parts can be unlatched and collapsed and the second ends of the frame members folded together to permit storage of the device in a place where space is limited.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENTS

Figure 1:
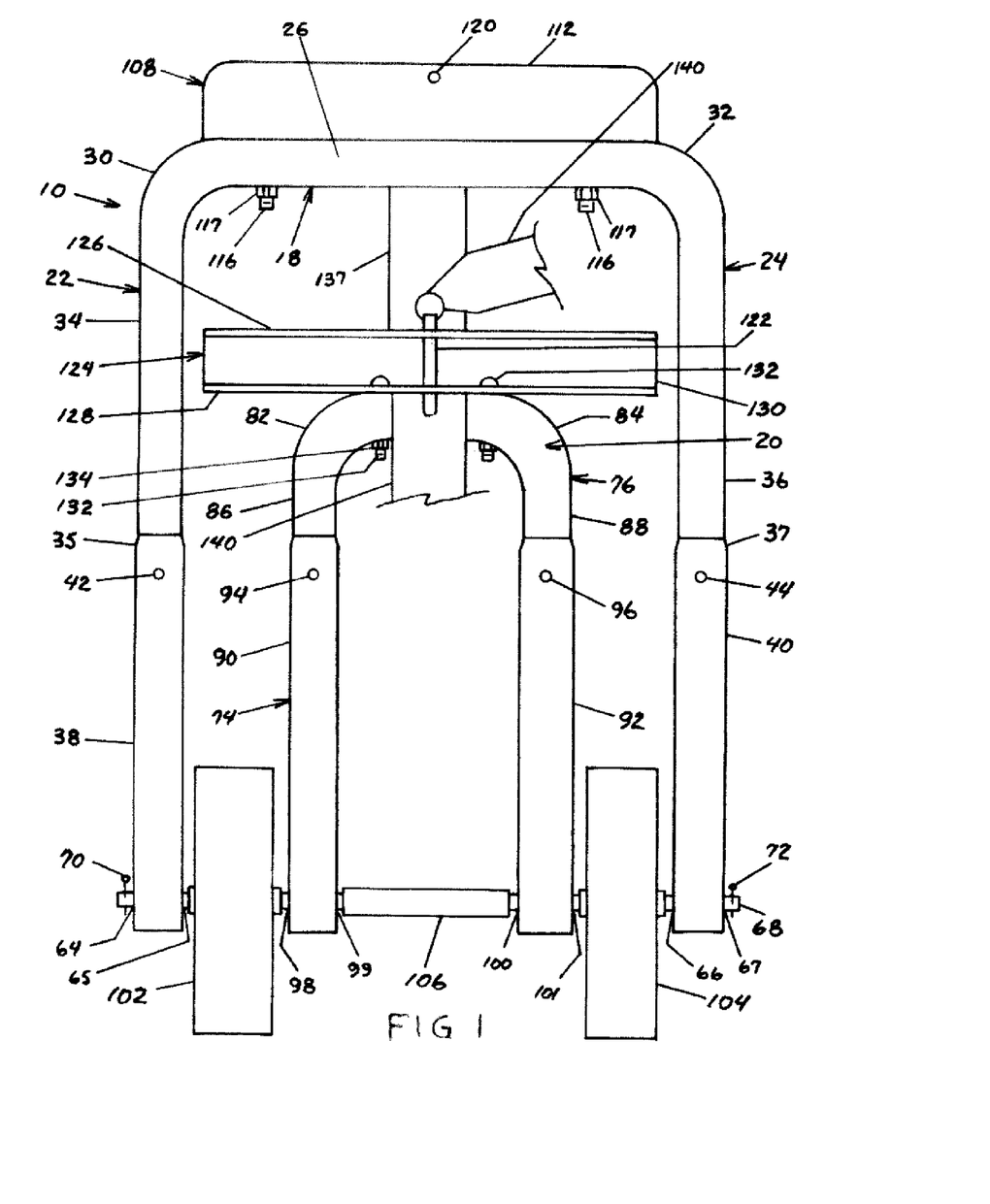
FIG. 1 is a front elevational view of a transporting device in accordance with the invention having a first frame member in an extended position and the second frame member in the retracted position.
Figure 2:
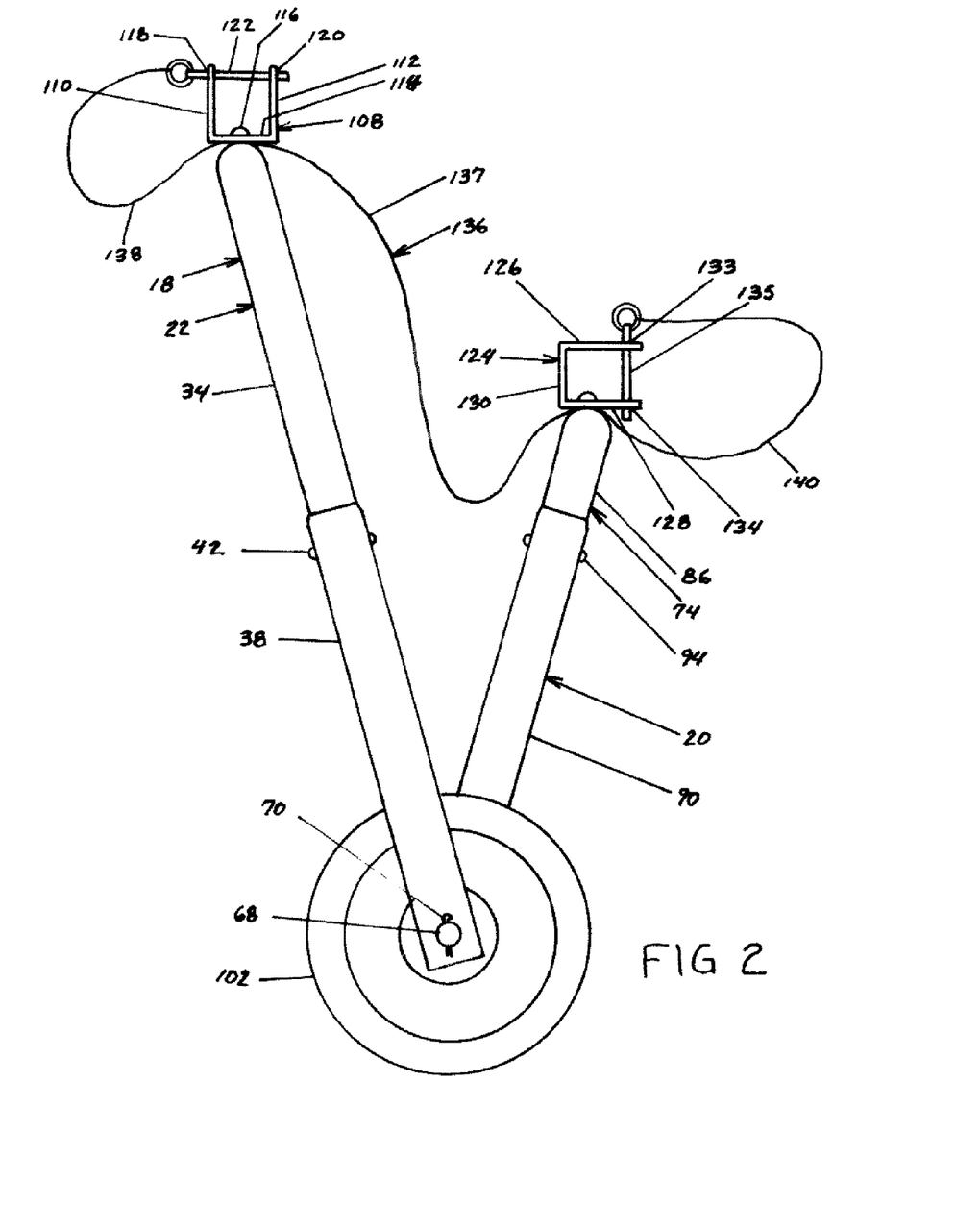
FIG. 2 is a side elevational view of the transportation device shown in FIG. 1 with the first frame member extended and the second frame member retracted as is shown in FIG. 1.
Figure 3:
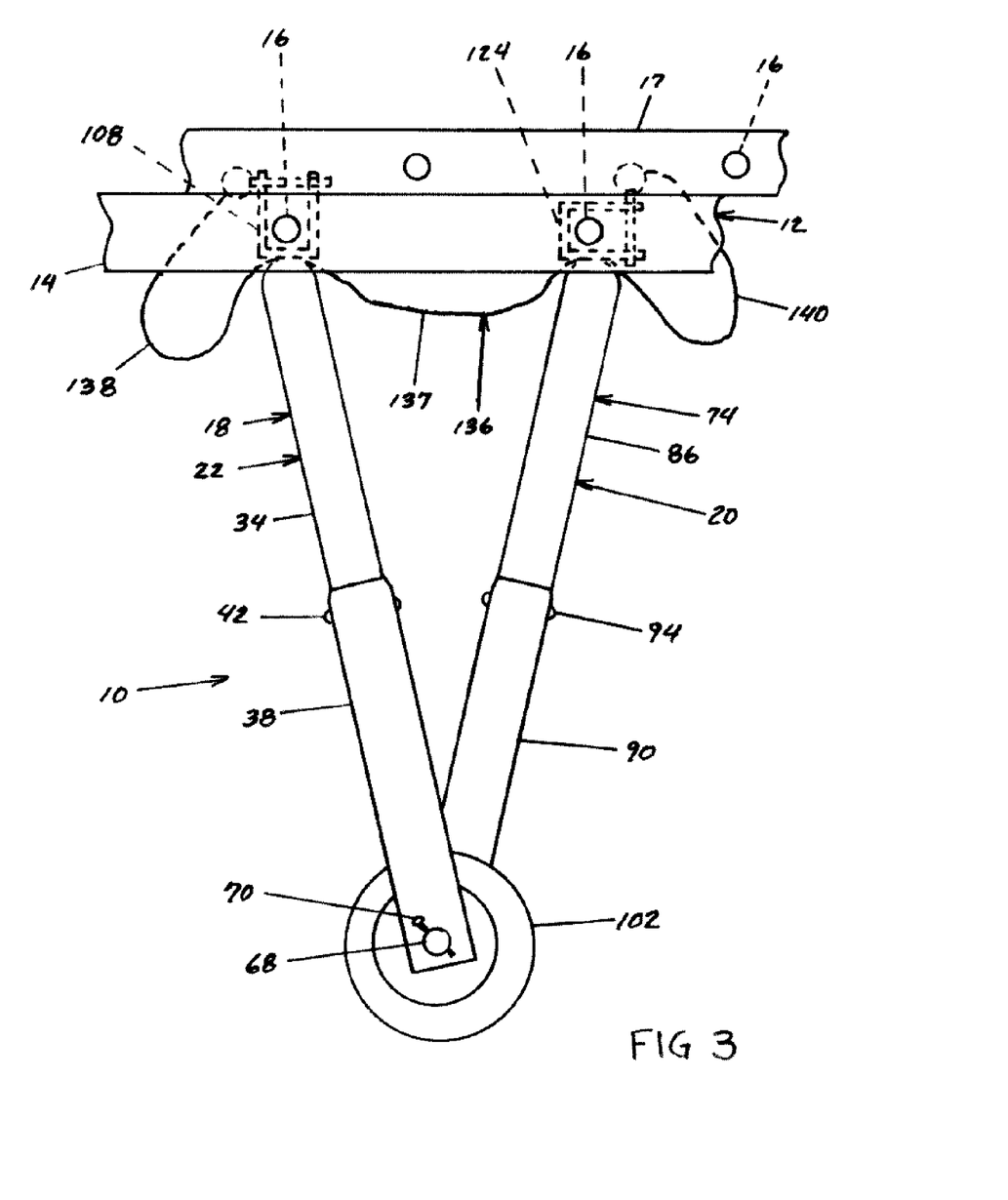
FIG. 3 is another side elevational view of the device shown in FIG. 1 with both frame members in their extended position and the device attached to a ladder.

Referring to FIGS. 1 through 3 and 6, a transporting device 10 is used to carry an elongate ladder 12 having first and second parallel side members respectively. Extending between the side members, one of which 14 is visible in FIG. 3, are a plurality of equally spaced parallel rungs 16-16. The spacings between the rungs 16-16 are usually about a foot, although the spacings may differ, the spacings are usually within an inch of one another from one manufacturer to another. The side members 14 are generally parallel to each other but the distance between the side members may expand towards one end to provide a wider base when the ladder is placed against the ground. As depicted in FIG. 3, The ladder 12 may be an extension ladder that includes an extension 17 as depicted having side members (not numbered) and rungs (not numbered) as shown.

To transport the ladder 12, the device 10 includes a first frame member 18 and a second frame member 20. The first frame member 18 has parallel spaced apart elongate side members 22, 24 with each of the side members 22, 24 having a lower end and an upper end. The upper ends of the side members 22, 24 are joined together by a crossbar 26 which rigidly retains the side members 22, 24 in parallel orientation such that the side members 22, 24 and crossbar 26 define an inverted U-shaped configuration. The side members 22, 24 are longitudinally collapsible to thereby reduce the overall size of the frame member 18. In the preferred construction, the first frame member 18 is formed from a first length of tubing having a linearly extending central portion that corresponds to the crossbar 26. At opposite ends of the central portion (crossbar 26) are ninety degree curves 30, 32 that lead into parallel end portions 34, 36 respectively with the end portions 34, 36 being substantially equal in length. Each of the end portions 34, 36 is telescopically received in tubular first and second telescopic portions 38, 40 respectively. The end portion 34 plus the associated telescopic portion 38 forms side member 22 and end portion 36 plus the associated telescopic portion 40 forms side member 24. The first and second telescopic portions 38, 40 have tubular configurations with the inner diameters thereof about one-eighth inch larger than the outer diameter of the end portion 34, 36 received therein to thereby allow the end portion 34, 36 to be easily telescoped into and out of their corresponding telescopic portions 38, 40. Preferably, the upper ends 35, 37 of the telescopic portions 38, 40 are swedged so that the inner diameter of the upper ends 35, 37 is only a few thousandths of an inch larger than the outer diameter of the corresponding end portions 34, 36.

Figure 4:
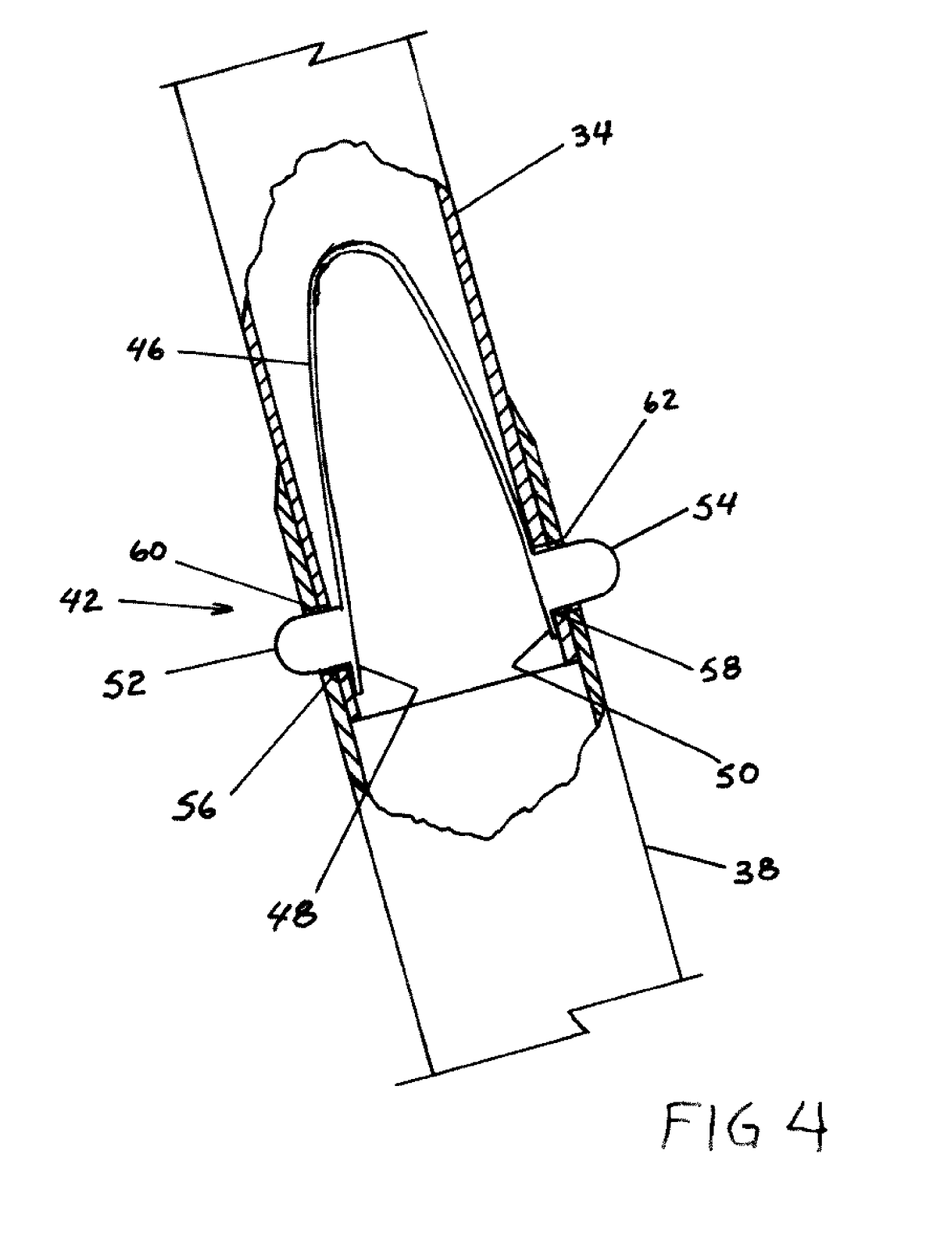
FIG. 4 is an enlarged cross-sectional view of one of the frame members showing the releasable latch for releasably retaining the frame member in an extended position.
Figure 5:
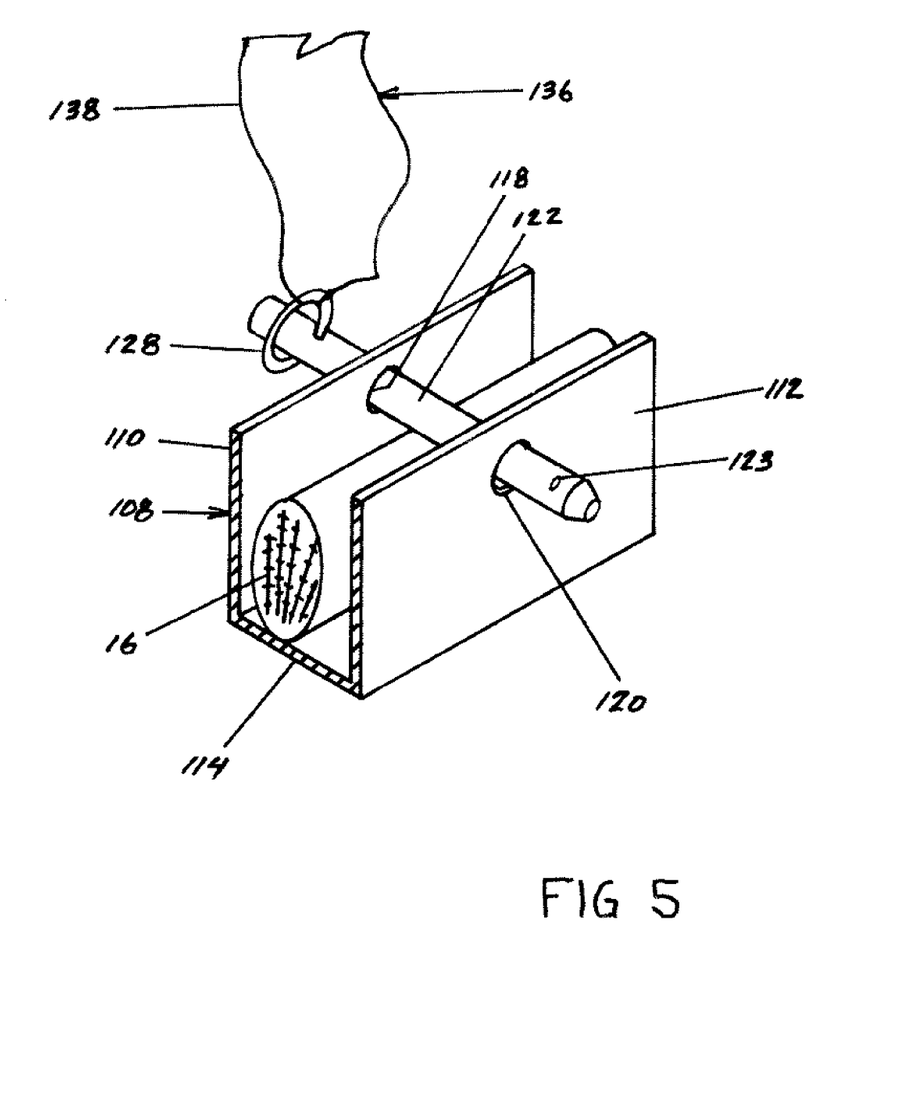
FIG. 5 is an enlarged isometric view showing a retaining pin for locking one of the hooks around the length of a rung of a ladder.

Referring to FIGS. 1 and 4, between each of the end portions 34, 36 and their corresponding telescopic portions 38, 40 are manually releasable latches 42, 44 of which latch 42, depicted in detail in FIG. 4, is representative of both. Each of the latches 42, 44 therefore includes a central V-shaped spring 46 having outer ends 48, 50 that are urged away from each other. At the ends 48, 50 of the spring 46 and directed axially away from each other are pin 52, 54 each of which is generally cylindrical in shape and oriented so as to be substantially coaxial to the other. The distal ends of each of the pins 52, 54 are hemispherical as shown to facilitate unlatching of the pins 52, 54 with respect to the telescopic portions 38. Extending through diametrically opposite portions of the first length of tubing 28 near the lower ends of the end portions 34, 36 are a pair of diametrically opposite transverse holes 56, 58, each of which has a diameter sized to slideably receive one of the pins 52, 54 of the V-shaped spring member 46. Similarly, at the upper end of the first and second telescopic portions 38, 40 are diametrically opposed transverse holes 60, 62 which also have diameters sized to slideably receive the distal ends of the pins 52, 54. The parts are assembled together with the pins 52, 54 fitted within the transverse holes 56, 58 of the first length of tubing 28 such that when the holes 56, 58 are aligned with the holes 60, 62 the distal ends of the pins 52, 54 will also extend through the holes 60, 62 thereby releasably latching each of the telescopic portions 38, 40 in the extended position to its associated end portion 34, 36 of the first length of tubing 28. To release latch 44, the distal ends of pins 52, 54 are compressed together by using one's fingers until the distal ends of pins 52, 54 slip out of holes 60, 62 in the telescopic portions 38, 40 thereby allowing the telescopic portions 38, 40 to move relative to the associated end portions 34, 36.

At the lower end of the telescopic portions 38, 40 are second pairs of diametrically opposed transverse holes 64, 65, 66, 67 all of which are aligned so as to rotatably receive an elongate central axle 68, which is retained between the lower ends of the telescopic portions 38, 40 by retaining pins 70, 72 at the distal ends of axle 68.

The second frame member 20 also includes parallel spaced apart side members 74, 76 and a crossbar 78 that extends between the upper ends of the side members 74, 76. In the preferred embodiment, the second frame member is formed by a second length of tubing having an elongate central portion that corresponds to the crossbar 76 at the ends of which are curves 82, 84 that curve the end portions 86, 88 ninety degrees with respect to the crossbars 78 and retain the end portions 86, 88 parallel to each other with the end portions 86, 88 being approximately equal in length.

In the preferred embodiment, the side members 74, 76 are also longitudinally compressible and include first and second telescopic portions 90, 92 the upper ends of which telescopically receive the end portions 86, 88 of the second length of tubing. The first and second telescopic portions 90, 92 are retained in the extended position by manually releasable latches 94, 96, each of which is substantially identical to the latch assemblies 42, 44 of the first frame member 18. At the lower end of each of the end portions 86, 88 are a pair of diametrically opposed transverse holes 98, 99, 100, 101 sized to rotatably receive the axle 68. The inner diameter of the telescopic portions 90, 92 are about one-eighth inch greater than the outer diameter of the second tubular member. Also, the upper ends of the telescopic portions 90, 92 are swedged like those of telescopic portions 38, 40.

As best shown in FIGS. 1 and 2, the side members 74, 76 of the second frame member 20 are spaced apart a distance that is significantly less than the spacing between the side members 22, 24 of the first frame member 18 such that rotatable wheels 102, 104 are received on the axle 68 with one wheel 102 fitted between the spaced apart lower ends of side members 22, 74 of frame members 18, 20 respectively and the other wheel 104 fitted between the lower ends of side members 24, 76 of first and second frame members 18, 20 respectively. A tubular spacer 106 is positioned around the central portion of the axle 68 that extends between side members 74, 76 of the second frame member 20.

Referring to FIGS. 1, 2, 3 and 5, extending along the crossbar 26 of the first frame member 18 is a U-shaped channel or hook 108 having parallel side members 110, 112 and an arcuate end portion 114 joining one end of each of the side members 110, 114. The cross-section of the channel hook 108 therefore forms a U-shaped configuration with the inner walls of side members 110, 112 spaced apart a distance that is greater than the diameter of a rung 16 of the ladder 12. The end portion 114 of the U-shaped channel 108 is retained to the crossbar 26 by a weld or a plurality of bolts 116-116 each of which is retained by a corresponding nut 117-117. The open end of the U-shaped channel 108, as defined by the parallel side members 110, 112 extends in a direction that is generally parallel to the side members 22, 24 of the first frame member 18. Near the outer ends of the parallel side members 110, 112 of the channel 108 are a pair of aligned transverse holes 118, 120 for removably receiving a retaining pin 122 for retaining the hook 108 around the rung 16 of the ladder 12. Preferably, the retaining pin 122 is a detent pin having a loop 121 at one end and a detent 123 near the opposite end thereof. The loop 120 is suitable for receiving a strap for retaining the pin 122 to the device 10 as described below, and the detent is compressible as is known in the art to prevent the spurious removal of pin 122 from the holes 118, 120.

Extending along the crossbar 78 of the second frame member 20 is a second U-shaped hook 124 that also includes parallel side members 126, 128 with an arcuate end portion 130 joining spaced apart ends of side members 126, 128 to thereby form a U-shaped configuration. One side member 126 of the U-shaped hook 124 is retained to the upper surface of the crossbar 78 of the second frame member 20 by a weld or a plurality of bolts 132-132 held in place by corresponding nuts 134-134, such that the open ends of the second U-shaped hook 124 as defined by the parallel sides 126, 128 is directed generally perpendicular to the side members 74, 76 of the second frame member 20. Near the outer end of side member 126 is a transverse hole 133 and near the outer end of side member 128 is another transverse hole 134 aligned with hole 133 so as to slideably receive a second detent retaining pin 135, similar to retaining pin 122, for removably retaining a second rung 16 of the ladder 12 in hook 124.

A connecting member 136 extends between the upper ends of the first frame member 18 and second frame member 20 to prevent the upper ends from being separated from each other by a distance that is significantly greater than the distance between adjacent rungs 16-16 of the ladder 12. Preferably, the connector 136 is in the form of a flexible strap. The flexible strap has a central portion 137, the length of which is approximately equal to the distance between adjacent rungs 16-16 of the ladder 12, or the distance between any multiple of the rungs 16-16 of the ladder 12. The strap 136 also has first and second end portions 138, 140 that extend from opposite sides of the central portion 137. In the preferred embodiment, one end of the central portion 137 of the strap 136 is tightly compressed between the U-shaped channel 108 and the crossbar 26 of the first frame member 18 and the other end of the central portion 137 is tightly compressed between the U-shaped hook 124 and the crossbar 78 of the second frame member 20 thereby fixing the length of central portion 137. The central portion 137 of the strap 136 retains the crossbars 26, 78 and the hooks 108, 124 affixed thereto from being moved a distance away from each other that is greater that required to attach the hooks to rungs of a ladder as is further described below. Fixed to each of the outer ends of end portions 138, 140 are pins 122, 135, each of which is sized to slideably extend into the pairs of transverse holes 118, 120 and 133, 134 of the hooks 108, 124 respectively for removably securing the hooks 108, 124 around an associated rung 16 of the ladder.

It should be appreciated that the connecting members 136 could be in the form of a pair of bars that are about equal in length and are hingedly attached end to end. The distal end of one bar is pivotally connected to the first frame member 18 and the distal end of the other bar is pivotally connected to the second frame member 20. The end to end bars will limit movement of the upper ends of frame member 18 away from one another, but the central hinge will allow the upper ends of frame member 18, 20 to be moved adjacent one another.

Figure 6:
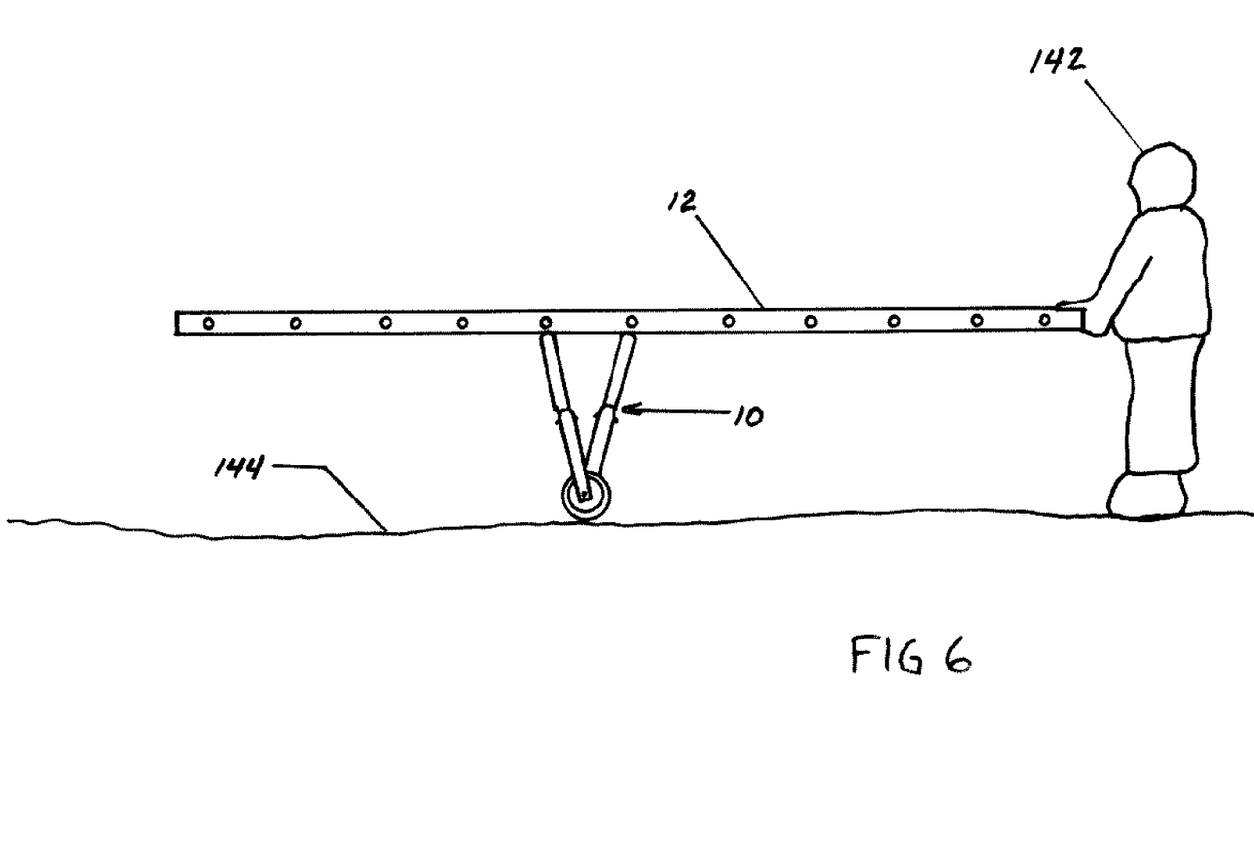
FIG. 6 depicts the device of FIG. 1 attached to a ladder for transporting by an operator.

To use the device 10, the telescopic portions 38, 40, 90, 92 of the first and second frame members 18, 20 are extended until the pins 52, 54 of each of the latch assemblies 42, 44, 94, 96 latch into their corresponding latching holes 60, 62 to lock the telescopic portions 38, 40, 94, 96 in their extended position with respect to their corresponding frame members 18, 20. Thereafter, the upper ends of the frame members 18, 20 are separated until the central portion 137 of the connecting strap 136 is taut. Thereafter, a centrally located rung 16 of a ladder 12 is inserted into the second hook 124 on the second frame member 20 after which a second rung 16 is inserted into the first hook 108 on the first frame member 18. The pins 122, 135 are then be inserted through the transverse holes 118, 120, and 133, 134 in the side members 110, 112, 126, 128 of the second hooks 108, 124 to lock both rungs 16-16 of the ladder 12 in place. With the device 10 thereby attached to a generally central location of the ladder, an operator 142 can grasp either end thereof and transport the ladder across open ground 144 as shown in FIG. 6. When the device 10 is not in use the pins 52, 54 of the latches are compressed and the telescopic portions 34, 36, 90, 92 are compressed. Also the upper ends of frame members 18 and 20 are pivoted about axle 68 until they contact each other such that the device is compressed to occupy a minimum amount of space for storage on an emergency vehicle.

It should be appreciated that hook 108 has been described as attached to cross bar 26 of frame member 18 along end portion 114 and hook 124 has been described as being attached along side member 126 to cross bar 78 of frame member 20 because we have found that the device 10 can be easily attached to the rungs 16-16 of a ladder 12 with the hooks 108, 124 assembled as described. However, the hooks 108 124 can be attached to the crossbars 26, 78 respectively in any of many orientations and still be easily attachable to the rungs 16-16 of a ladder 12.

While the present invention has been described with respect to one embodiment, it will be appreciated that many modifications and variations may be made without departing from the spirit and scope of the invention. It is therefore the intent of the appended claims to cover all such modifications and variations that fall within the spirit and scope of the invention.

What is claimed:

1. A device for transporting a ladder having a plurality of equally spaced parallel rungs, said device comprising
a first frame having an upper end and a lower end,
a second frame having an upper end and a lower end,
an axle extending through apertures in said lower ends of said first and second frame wherein said upper end of said first and second frame are only moveable through an arc with respect to said axle,
a wheel on said axle for moving said device across ground,
a first hook on said upper end of said first frame for removably receiving a first rung of said ladder,
a second hook on said upper end of said second frame for removably receiving a second rung of said ladder,
a connector having a first end and a second end,
said first end of said connector attached to said first frame at a location spaced from said lower end of said first frame,
said second end of said connector attached to said second frame at a location spaced from said lower end of said second frame,
said connector having a fixed length for preventing movement of said upper end of said first frame beyond a fixed distance from said upper end of said second frame, and
said connector being collapsible wherein said first frame member is pivotable about said axle until said upper ends of said first and second frame members are adjacent each other.

2. The device of claim 1 wherein said first frame is longitudinally adjustably moveable between an extended configuration and a compressed configuration and includes a latch for releasably retaining said first frame member in said extended configuration.

3. The device of claim 1 and further comprising
said first frame having a longitudinal member extending between said axle and said first hook,
said longitudinal member including an elongate member and an extension portion longitudinally moveable with respect to said elongate members,
said extension portion moveable between a contracted orientation and an extended orientation with respect to said elongate member, and
a manually operable latch between said elongate member and said extension portion for releasably retaining said extension member in said extended orientation.

4. The device of claim 1 wherein said connector is a flexible strap having flexibility continuously along a length thereof.

5. The device of claim 1 and further comprising
said first hook having generally parallel first and second hook ends, and a removable retainer extending across said first and second hook ends for retaining said hook around a rung of a ladder.

6. The device of claim 5 wherein said first and second hook ends each has a transverse hole thereon and said removable retainer is a pin extending through said first and second hook ends.

7. The device of claim 6 wherein said pin is a detent pin.

8. The device of claim 5 and further comprising said first frame having a longitudinal member extending between said axle and said first hook, said longitudinal member including an elongate member and an extension portion longitudinally moveable with respect to said elongate members, said extension portion moveable between a contracted orientation and an extended orientation with respect to said elongate member, and a manually operable latch between said elongate member and said extension portion for releasably retaining said extension member in said extended orientation.

9. The device of claim 8 wherein said connector is a flexible strap, having flexibility continuously along a length thereof.

10. The device of claim 9 wherein said first and second hook ends each has a transverse hole thereon and said removable retainer is a pin extending through said first and second hook ends.

11. The device of claim 10 wherein said pin is a detent pin.

12. A device for transporting a ladder having a plurality of equally spaced parallel rungs, said device comprising a first frame having an upper end and a lower end, a second frame having an upper end and a lower end, an axle extending through apertures in said lower ends of said first and second frame wherein said first and second frame are independently pivotable about said axle, a wheel on said axle for moving said device across ground, a first hook on said upper end of said first frame for removably receiving a first rung of said ladder, a second hook on said upper end of said second frame for removably receiving a second rung of said ladder, a connector between said first frame and said second frame, said connector having a fixed length and preventing movement of said upper end of said first frame beyond a fixed distance from said upper end of said second frame wherein said fixed distance is equal to a distance between two rungs of said ladder, and said connector being collapsible wherein said first frame member is pivotable about said axle until said upper ends of said first and second frame members are adjacent each other.

13. The device of claim 12 and further comprising said first frame having a longitudinal member extending between said axle and said first hook, said longitudinal member including an elongate member and an extension portion longitudinally moveable with respect to said elongate members, said extension portion moveable between a contracted orientation and an extended orientation with respect to said elongate member, and a manually operable latch between said elongate member and said extension portion for releasably retaining said extension member in said extended orientation.

14. The device of claim 13 wherein said connector is a flexible strap.

15. The device of claim 13 and further comprising said first hook having generally parallel first and second hook ends, and a removable retainer extending across said first and second hook ends for retaining said hook around a rung of a ladder.

16. The device of claim 15 wherein said first and second hook ends each has a transverse hole thereon and said removable retainer is a pin extending through said first and second hook ends.

17. The device of claim 16 wherein said pin is a detent pin.

* * * * *